United States Patent
Yin

(10) Patent No.: US 8,254,494 B2
(45) Date of Patent: Aug. 28, 2012

(54) METHOD AND DEVICE FOR IMPLEMENTING DATA TRANSMISSION

(75) Inventor: Xinshe Yin, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 832 days.

(21) Appl. No.: 12/265,005

(22) Filed: Nov. 5, 2008

(65) Prior Publication Data

US 2009/0213941 A1    Aug. 27, 2009

(30) Foreign Application Priority Data

Feb. 21, 2008  (CN) .......................... 2008 1 0057958

(51) Int. Cl.
  *H04L 25/03*   (2006.01)
(52) U.S. Cl. .......... 375/296; 375/295; 345/30; 710/100
(58) Field of Classification Search .............. 375/295, 375/296; 345/30; 710/100
See application file for complete search history.

(56) References Cited

U.S. PATENT DOCUMENTS

| | | | | |
|---|---|---|---|---|
| 6,388,722 | B1* | 5/2002 | Yoshii et al. | 349/62 |
| 7,411,840 | B2* | 8/2008 | Gaskins et al. | 365/189.07 |
| 2001/0015712 | A1* | 8/2001 | Hashimoto | 345/92 |
| 2002/0186193 | A1* | 12/2002 | Lee et al. | 345/96 |
| 2007/0038789 | A1* | 2/2007 | Macri et al. | 710/105 |

\* cited by examiner

*Primary Examiner* — Shuwang Liu
*Assistant Examiner* — David Huang
(74) *Attorney, Agent, or Firm* — Ladas & Parry LLP

(57) ABSTRACT

A method of implementing data transmission is provided, which comprises: A) comparing bit by bit data to be transmitted currently with previous transmitted data, and counting to obtain total number of different bits; and B) when it is determined that the total number of different bits is more than a half of number of bits of the data to be transmitted currently, inverting the data to be transmitted currently and then converting the inverted data into a differential signal for transmission. A device of implementing data transmission is also provided. The method and device provided by embodiments of the present invention can minimize electromagnetic interference during data transmission.

6 Claims, 2 Drawing Sheets

METHOD AND DEVICE FOR IMPLEMENTING DATA TRANSMISSION

TECHNICAL FIELD OF THE INVENTION

The present invention directs to a data transmission technology using differential signals, in particular, to a method and device for implementing data transmission.

BACKGROUND OF THE INVENTION

A data transmission using differential signals has been widely adopted in computers, telecommunication equipments, consumer electronics and the like. The differential signal uses one numeral value to represent difference between two physical quantities, and the differential signal, regardless of a data signal or a clock signal, adopts two signals, i.e. signal pair, with one signal representing positive and the other signal representing negative. When level of the positive differential signal is higher than that of the negative differential signal, the differential signal denotes logical "1", and in the contrast, when the level of the negative differential signal is higher then that of the positive differential signal, the differential signal denotes logical "0".

Nowadays, the differential signals used in data transmission primarily comprise a low voltage differential signal (LVDS), an inner system interface signal mini-low voltage differential signal (mini-LVDS) and a reduced swing differential signal (RSDS). With respect to the inner system interface signal, there are many other types of differential signal, such as point to point differential signal (PPDS), wise-BUS and the like.

In the prior art, when carrying out data transmission through the differential signals, data to be transmitted is converted to a differential signal directly and then is transmitted. In such case, if the number of bits for change between previous set of transmitted data and succeeding set of transmitted data exceeds a half of length of the data set, then the number of bit for change of the positive signal and negative signal amplitude of the differential signal would be more than the number of bit for non-changed. It can be observed in most of cases, during the data transmission, the more the changed bits is, the worse the electromagnetic interference is.

SUMMARY OF THE INVENTION

In view of the above, the main object of the present invention is to provide a method and device for implementing data transmission which can reduce the electromagnetic interference during the data transmission.

To achieve the above object, the solution of the present invention is embodied as follows:

The present invention provides a method of implementing data transmission, the method comprises:

A) comparing bit by bit data to be transmitted currently with previous transmitted data, and counting to obtain total number of different bits; and
B) when it is determined that the total number of different bits is more than a half of number of bits of the data to be transmitted currently, inverting the data to be transmitted currently and then converting the inverted data into a differential signal for transmission.

Wherein the step B) further comprises:
when it is determined that the total number of different bits is not more than the half of number of bits of the data to be transmitted currently, directly converting the data to be transmitted currently into a differential signal for transmission.

Prior to the step A), the method further comprises:
A0) determining the data to be transmitted currently and the previous transmitted data.

After the comparing bit by bit is finished, the step A) further comprises: saving the data to be transmitted currently as the previous transmitted data.

Data structure of the differential signal is:
a data beginning signal is integrated internally into the differential data, and correspondingly, a status information bit indicating whether the data is inverted is inserted between the data beginning signal and transmission data; or
the data beginning signal is transmitted separately, and correspondingly, after the data beginning signal arrives a receiver, the status information bit indicating whether the data is inverted and the transmission data are transmitted in sequence; or
the data beginning signal and the status information bit indicating whether the data is inverted are transmitted separately and respectively, and correspondingly, after the data beginning signal arrives the receiver, the status information bit is transmitted, and after the status information bit arrives the receiver, the corresponding data is transmitted.

A device of implementing data transmission is also provided by the present invention, the device comprises: a transmission data determination module, a data processing module, a data inversion module and a differential signal generation module, wherein, the transmission data determination module is adapted to determine data to be transmitted currently and send the data to the data processing module;
the data processing module is adapted to compare bit by bit the received data with previous transmitted data and count total number of different bits, and when the total number of different bits is more than a half of number of bits of the data to be transmitted currently, send the data to be transmitted currently to the data inversion module;
the data inversion module is adapted to inverted the received data and send the inverted data to the differential signal generation module; and
the differential signal generation module is adapted to converted the received data into a corresponding differential signal for transmission outward.

Wherein, the data processing module is further adapted to:
when the total number of different bits is not more than the half of number of bits of the data to be transmitted currently, directly send the data to be transmitted currently to the differential signal generation module.

The data processing module is further adapted to:
after the comparing is finished, save the data to be transmitted currently as the previous transmitted data.

Data structure of the differential data is:
a data beginning signal is integrated internally into the differential data, and a status information bit indicating whether the data is inverted is set between the data beginning signal and transmission data; or
the data beginning signal is transmitted separately, and after the data beginning signal arrives, the status information bit indicating whether the data is inverted and the transmission data are transmitted in sequence; or
the data beginning signal, the status information bit indicating whether the data is inverted and the transmission data are transmitted separately in sequence With the method and device for implementing data transmission according to the embodiment of the present invention, at each time before carrying out data transmission, data to be transmitted currently is compared bit by bit with previous transmitted data, and when the total number of different bits is more than a half of the number of bits of the data to be transmitted currently, the data to be transmitted currently is inverted and then is converted to a differential signal for transmission, otherwise, the data to be transmitted currently is converted directly to a differential signal for transmission. As such, it can be assured that the number of bits for change of the positive and negative signal amplitude of the differential signal is always less than the number of bits for non-changed, thus the electromagnetic interference during the data transmission is reduced.

DETAILED DESCRIPTION

The basic concept of the present invention is that data to be transmitted currently is compared bit by bit with previous transmitted data, and when the total number of different bits is more than a half of the number of bits of the data to be transmitted currently, the data to be transmitted currently is inverted and then is converted to a differential signal for transmission, otherwise, the data to be transmitted currently is converted directly to a differential signal for transmission outward.

Next, the method and device for implementing data transmission according to the present invention are described in connection with embodiments and drawings.

Figure 1:
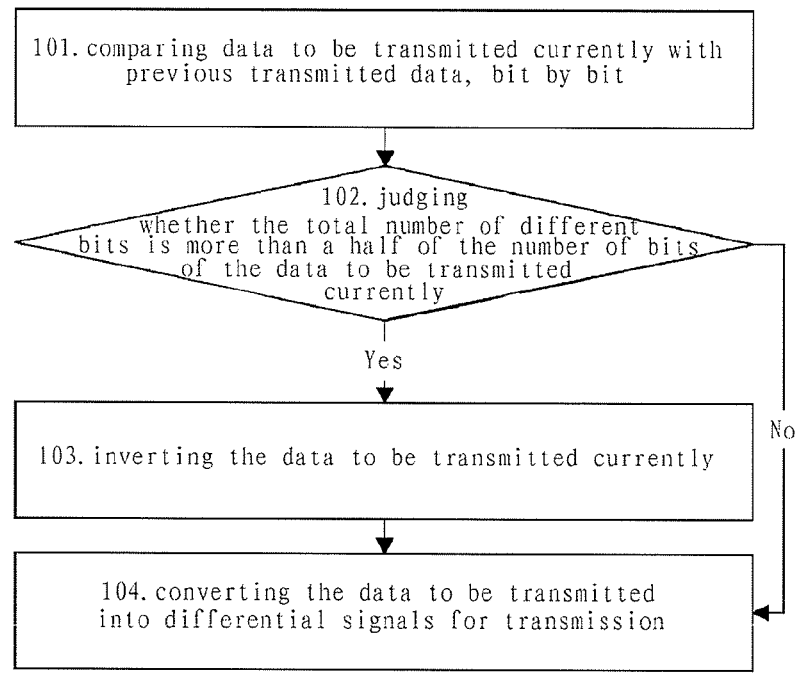
FIG. 1 is schematic flow chart of a method for implementing data transmission according to the present inventions.

FIG. 1 is schematic flow chart of a data transmission method according to an embodiment of the present inventions. As shown in FIG. 1, the method comprises:

Step 101, data to be transmitted currently and previous transmitted data are determined, and the determined two sets of data are compared bit by bit, the number of different bits is counted as the total number of the different bits.

Wherein, how to determine the data to be transmitted currently is well known in the art, the details of which are omitted there.

With respect to determining the previous transmitted data, it is carried out by saving the previous transmitted data. The previous transmitted data denotes a set of data having been transmitted at a most closely moment to the present moment. The transmitted data is in form of data set or data packet in most of cases, and length of the transmitted data is not restricted and is able to be set depending on real application, however, the data length of each transmission is same, that is, the length of the two sets of data to be compared is same.

Wherein, the present step can be realized by means of two data set registers. For example, the two registers are a register A and a register B, wherein the register A stores the previous transmitted data and the register B stores the data to be transmitted currently. For each time after the data to be transmitted currently is determined, the determined data is stored into the register B. And for each time after the two sets of data is compared, the data to be transmitted currently stored in the register B is sent to the register A and stored therein, as such, the data in the register A is the previous transmitted data when comparing for the next time.

Wherein, how to comparing the two sets of data bit by bit, and how to count the number of different bits can be implemented using relate to technologies in the art, the details of which are omitted here.

Step 102, it is judged whether the total number of different bits is more than a half of the number of bits of the data to be transmitted currently, and if so, step 103 is performed, and if not, step 104 is performed.

The step 103, the data to be transmitted currently is inverted.

Wherein, the inversion is to invert each bit of the logical data corresponding to the data to be transmitted currently.

The step 104, the data to be transmitted currently is converted to a differential signal for transmission; and, a status information bit Rev is added when transmitted the different signal. The Rev indicates whether the inversion has been made upon the transmitted data.

Here, since the data to be transmitted currently could be the inverted data to be transmitted currently in the step 103, or the data to be transmitted currently without the inversion of the step 103, the resultant differential signal's data structure needs to be altered correspondingly, in order to indicate a receiver receiving such differential signal whether the received data needs to be inverted to obtain the correct data.

Figure 2A:
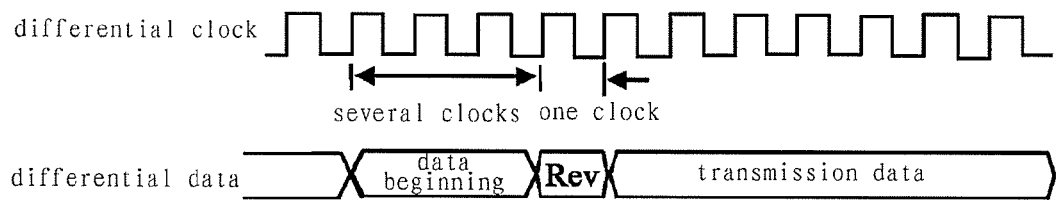
FIG. 2A, FIG. 2B and FIG. 2C are schematic diagrams of data structures of differential signals according to embodiments of the present invention.
Figure 2B:
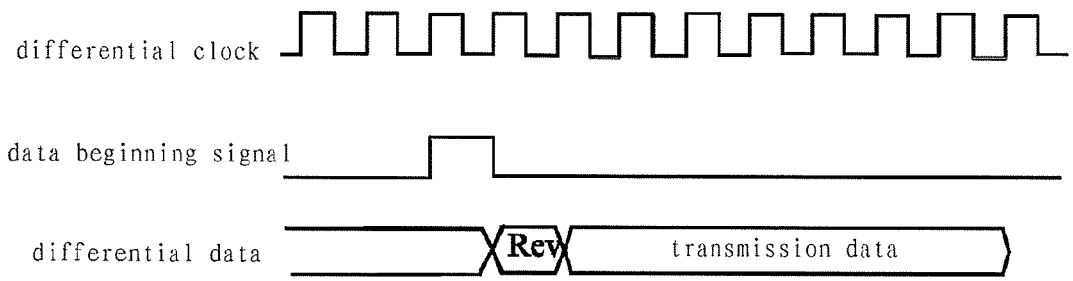
Figure 2C:
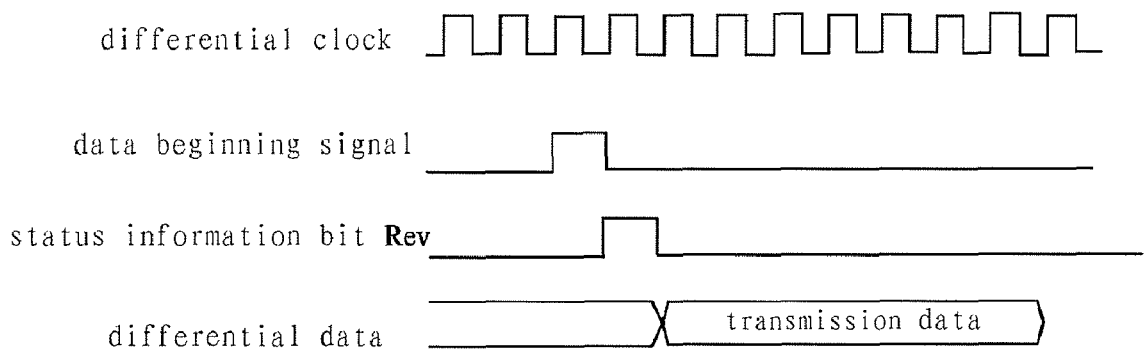

For example, the data structure of the differential data can be a data structure shown in FIG. 2A, that is, when a data beginning signal is integrated internally into the differential data, the status information bit Rev is added between the original data beginning signal and the transmitted data. Alternatively, the data structure of the differential data can be a data structure shown in FIG. 2B, that is, when the data beginning signal is not integrated internally into the differential data and there is another individual signal, the status information bit Rev is transmitted first and then the data is transmitted after the beginning signal arrives. Further alternatively, the data structure of the differential data can be a data structure shown in FIG. 2C, the status information bit Rev is transmitted via a separate signal line, and after the data beginning data arrives the receiver, the status information bit Rev is transmitted separately, and after the status information bit Rev arrives at the receiver, corresponding data is transmitted. Wherein, it is not restricted here how the status information bit Rev denotes whether the inversion has been made, so the implementation can be decided according to applications. For example, it can be set that when the status information bit Rev is 1, it denotes that the transmitted data has been inverted, whereas when the status information bit Rev is 0, it denotes that the transmitted data has not been inverted. In addition, the implementation of the above data structures can be realized by related technologies in the art, the details of which are omitted here.

And related technologies in the art can be used to convert the data into the differential signal, the details of which are omitted here.

Figure 3:
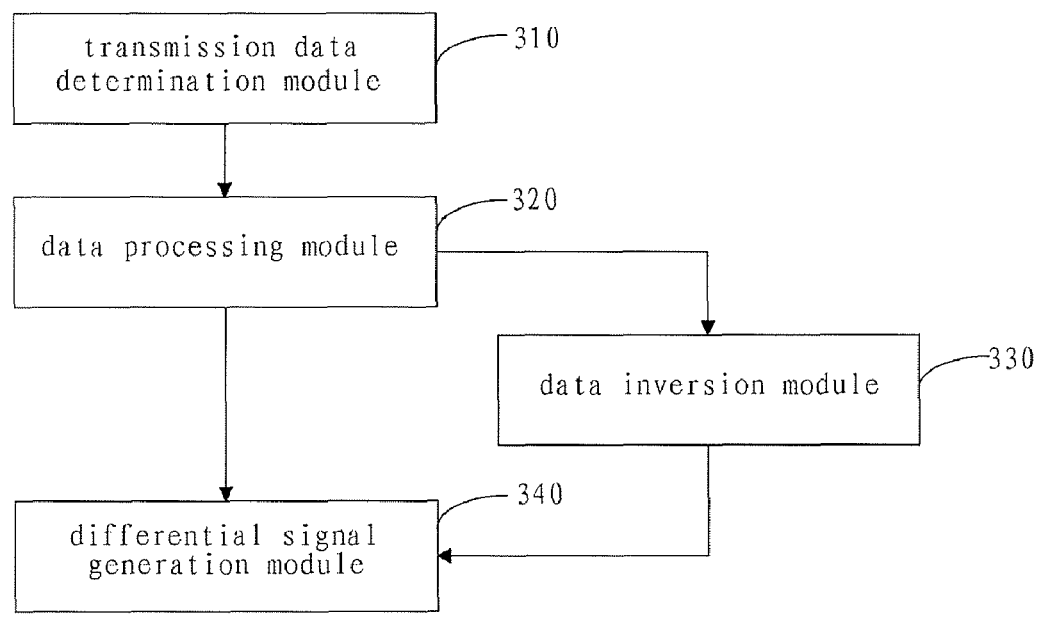
FIG. 3 is a structural schematic diagram of device for implementing data transmission according to the present invention.

FIG. 3 is a structural schematic diagram of device for implementing data transmission according to an embodiment of the present invention. As shown in FIG. 3, the device comprises a transmission data determination module 310, a data processing module 320, a data inversion module 330 and a differential signal generation module 340.

Wherein, the transmission data determination module 310 is for determining data to be transmitted current and sending the data to the data processing module 320.

The data processing module 320 is for, after receiving the data, comparing bit by bit the received data to be transmitted currently with the previous transmitted data, and counting the number of different bits, and when the total number of the different bits is more than a half of the number of bits of the data to be transmitted currently, sending the data to be transmitted currently to the data inversion module, otherwise, sending the data to be transmitted currently to the differential signal generation module 340 directly. The data processing module 320 is also for, after comparison is finished, storing the data to be transmitted currently as the previous transmitted data for the next data comparison.

The data inversion module 330 is for inverting the received data and sending the inverted data to the differential signal generation module 340.

The differential signal generation module 340 is for converting the received data to a corresponding differential signal for transmission.

The above description is provided for some advantageous embodiments of the invention, and does not intend to limit the scope of the present invention in any means.

The invention claimed is:

1. A method of implementing data transmission, characterized in that the method comprises:
   A) comparing bit by bit data to be transmitted currently with previous transmitted data, and counting to obtain a total number of different bits; and
   B) when it is determined that the total number of different bits is more than a half of number of bits of the data to be transmitted currently, inverting the data to be transmitted currently and then converting the inverted data into a differential signal for transmission,
   wherein the step B) further comprises: when it is determined that the total number of different bits is not more than the half of number of bits of the data to be transmitted currently, directly converting the data to be transmitted currently into a differential signal for transmission, and wherein
   the differential signal has a data structure characterized in that:
   a data beginning signal is integrated internally into the differential signal, and correspondingly, a status information bit indicating whether the data is inverted is inserted between the data beginning signal and the data to be transmitted currently; or
   the data beginning signal is transmitted separately, and correspondingly, after the data beginning signal arrives at a receiver, the status information bit indicating whether the data is inverted and the data to be transmitted currently are transmitted in sequence; or
   the data beginning signal and the status information bit indicating whether the data is inverted are transmitted separately and respectively, and correspondingly, after the data beginning signal arrives at the receiver, the status information bit is transmitted, and after the status information bit arrives at the receiver, the data to be transmitted currently is transmitted, wherein the status information bit indicating whether the data is inverted occupies one clock period of a differential clock signal, and is transmitted as a part of differential signal sequence previous to the data to be transmitted currently.

2. The method of claim 1, characterized in that prior to the step A), the method further comprises determining the data to be transmitted currently and the previous transmitted data.

3. The method of claim 1 further comprising saving the data to be transmitted currently as the previous transmitted data after comparing bit by bit the data to be transmitted currently with the previous transmitted data.

4. An apparatus comprising:
   a data inverter;
   a data transmitter that transmits current data;
   a data processor that receives the current data and compares the current data bit by bit with previously transmitted data and counts a total number of different bits, and when the total number of different bits is more than a half of number of bits of the current data, the data processor sends the current data to the data inverter, wherein; the data inverter inverts the current data; and
   a differential signal generator that receives the inverted current data from the data inverter and converts the inverted current data into a corresponding differential signal for transmission, wherein the differential signal has a data structure characterized in that:
   a data beginning signal is integrated internally into the differential signal, and a status information bit indicating whether the data is inverted is set between the data beginning signal and the differential signal; or
   the data beginning signal is transmitted separately, and after the data beginning signal arrives, the status information bit indicating whether the data is inverted and the differential signal are transmitted in sequence; or
   the data beginning signal, the status information bit indicating whether the data is inverted and the differential signal are transmitted separately in sequence, wherein the status information bit indicating whether the data is inverted occupies one clock period of a differential clock signal, and is transmitted as a part of differential signal sequence previous to the data to be transmitted currently.

5. The apparatus of claim 4, wherein when the total number of different bits is not more than half of the number of bits of the current data, the data processor sends the current data directly to the differential signal generator.

6. The apparatus of claim 5, wherein after comparing the current data bit by bit with previously transmitted data, the data processor saves the current data as previously transmitted data.

* * * * *